Patented June 25, 1946

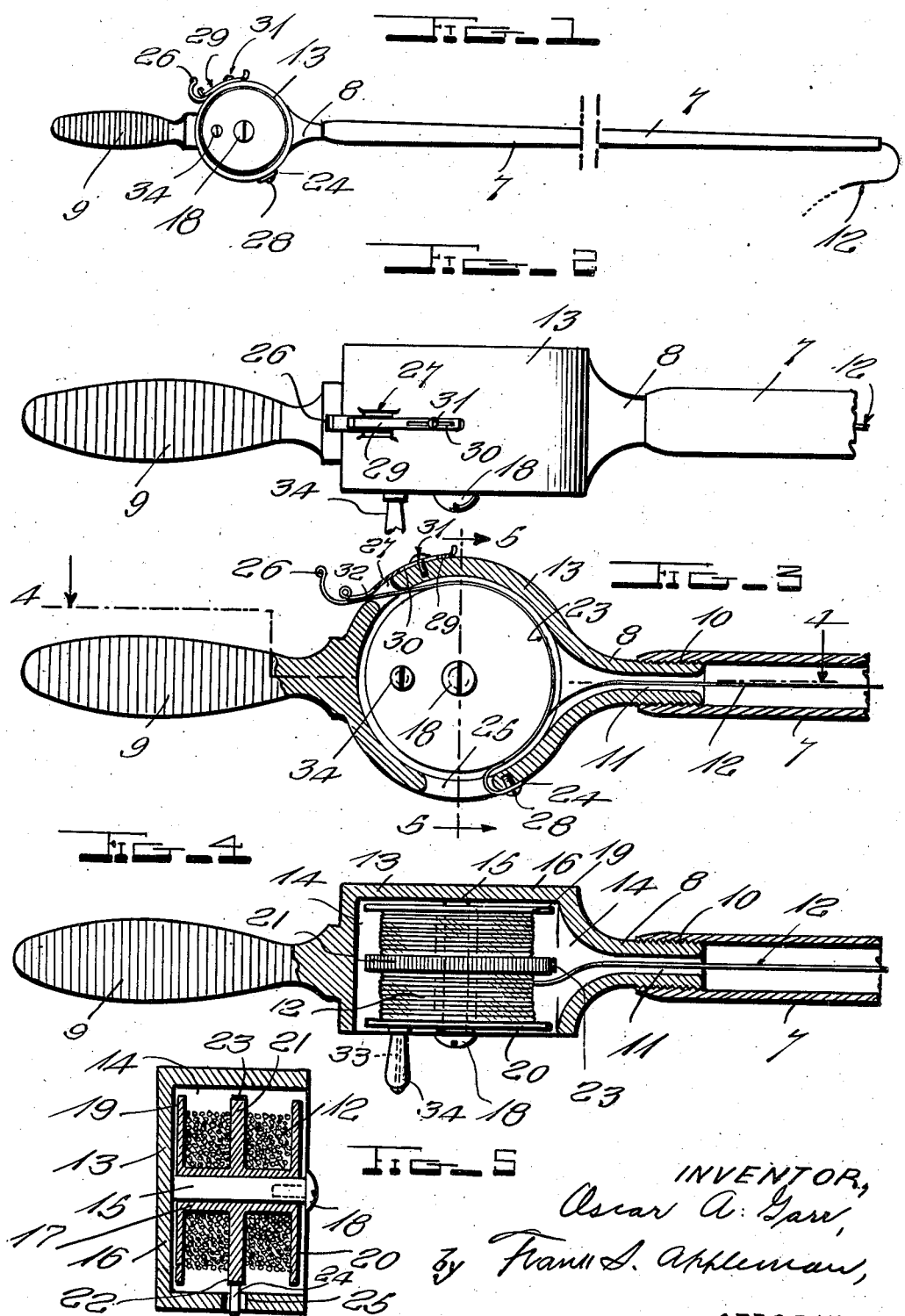

2,402,882

UNITED STATES PATENT OFFICE 2,402,882

COMBINATION ROD HANDLE AND REEL

Oscar A. Garr, Tulsa, Okla.

Application February 7, 1945, Serial No. 576,644

2 Claims. (Cl. 43—20)

This invention relates to fishing rod handles and reels, and an object of the invention is to provide a rod handle having an interior channel, through which the line of a fishing equipment may be projected or retracted as the operation proceeds, and it is the purpose of the inventor to form the rod handle or butt of material that may be molded or fashioned into forms that may be modified at will, the material having the characteristics of resiliency and durability such as are usually found in fishing equipment.

It is a further object of the invention to produce a fishing rod butt or handle with a chamber in which a reel may be confined and operated, the handle of said reel projecting beyond the chamber for manipulation by the fisherman; it being a further object of the invention to produce a reel operable within the chamber, which reel has a capacity for holding two lines on the spool of the reel, which lines may be used successively as fishing conditions warrant, that is to say, one of the lines may be of greater tensile strength than the other, or they may be of arbitrarily determined characteristics.

It is a still further object of the invention to produce a two-compartment reel having a dividing disk or plate, the periphery of which acts as a brake drum to be engaged by a brake band, operative to retard the rotation of the spool or reel under manipulation of the fisherman, and means are further provided for the mechanical control of the brake band so that a greater or less degree of friction may be imparted to the brake drum, a condition which is advantageous particularly in casting where the weight of the lure, such as a plug or the like, determines the pull on the line and reel when the lure is cast, since the proper regulation of the brake would prevent back lashing and the incidental confusion arising therefrom.

The invention furthermore comprises a fishing equipment in which the installed reel facilitates the preparation for the fishing operation, as compared with those equipments in which the reel is to be mounted externally of the butt and where the line has to be threaded through guides and the tip of a rod, the said equipment having proven efficient and satisfactory in use and comparatively inexpensive to manufacture and maintain.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a view in side elevation, showing a fishing equipment embodying the invention;

Figure 2 illustrates a top plan view thereof;

Figure 3 illustrates a longitudinal vertical sectional view;

Figure 4 illustrates a central sectional view of the casing and a fragment of the rod with the reel in plan, on the line 4—4 of Fig. 3; and Figure 5 illustrates a sectional view on the line 5—5 of Fig. 3.

In the drawing 7 denotes a rod preferably detachable from a tubular extension 8 of the butt or handle 9. The portion 7 of the rod may comprise a single tubular element or it may be sectional as indicated by the dotted lines in Figure 1, and the inventor does not wish to be limited with respect to this construction, although preferably it is made of resilient plastic or other suitable material and it has a joint, as at 10, with the extension 8. The joint may be frictional or threaded as the dictates of the manufacture may suggest. The extension 8 has a channel 11 registering with the hollow portion of the rod 7, through which a line 12 may be fed. An enlarged portion 13 of the butt or handle has a chamber 14, and a spindle 15 has one end anchored to a side wall 16 of the chamber and it projects transversely through the chamber.

A reel has a barrel 17 mounted on the spindle so that the reel is rotatable thereon and the reel may be held on the spindle by appropriate means, such as a screw 18, although it is obvious that a crown nut may be threaded externally on the end of the spindle as such crown nuts are in common use on reels. The reel has end flanges or plates 19 and 20 with an intermediate annular partition or plate 21 forming a brake drum, the periphery 22 of which is engaged by a brake band 23 operating in conjunction with the braking surface to regulate the run of the reel and, as illustrated, the brake band has a hooked end 24 which embraces an edge of the wall of the chamber where an aperture 25 is formed in the wall. The brake band extends around the periphery of the drum for a suitable distance and has its end 26 projecting through an aperture 27 of the wall and shaped to form a finger grip whereby pressure is applied to the brake band as the fishing operation proceeds. The curved end 24 of the brake band may be anchored in place by a screw 28 although, under certain conditions, the resiliency of the metal of the brake band may be relied upon to hold the brake band seated at its inner end. Each section of the reel between the plate 21 and the end flanges is occupied by a line such as 12 for arbitrary use as a fisherman desires.

In order to maintain a certain braking action, due to the engagement of the brake band with the drum, mechanical means are provided for holding the brake band in engagement with the drum with pressure that may be varied to suit the requirements while casting, to prevent back lash, as has heretofore been mentioned, and this mechanism comprises a plate 29 having a slot 30 therein. A screw or detent 31 extends through the slot and is anchored to the enlarged portion of the butt of the rod. The plate extends into engagement with the brake band as at 32 and its pressure on the brake band may be regulated for the purpose indicated.

A pin or spindle 33 has one end anchored to the end plate 20 of the reel and a handle 34 is rotatable on the pin so that by this means the reel is rotated to wind the line on the reel.

I claim:

1. In fishing equipment, a handle having an enlarged portion with a chamber therein, a spindle attached to the enlarged portion of the handle and projecting laterally through the chamber, a reel rotatably mounted on the spindle, said reel having end flanges and an intermediate partition dividing the reel into two line-containing sections, the intermediate partition having a braking surface, a brake band partially embracing the periphery of the intermediate partition, means for anchoring one end of the brake band to the enlarged portion of the handle, a finger grip at the end of the brake band externally of the chamber for regulating the friction on the brake band, mechanical means for holding the brake band at different tensions on the intermediate partition, and a tubular extension from and integral with the enlarged portion of the handle forming a guide for a line.

2. In fishing equipment, a handle having an enlarged portion with a chamber therein, a spindle attached to the enlarged portion of the handle and projecting laterally through the chamber, a reel rotatably mounted on the spindle, said reel having end flanges and an intermediate partition dividing the reel into two line-containing sections, the intermediate partition having a braking surface, a brake band partially embracing the periphery of the intermediate partition, means for anchoring one end of the brake band to the enlarged portion of the handle, a finger grip at the end of the brake band externally of the chamber for regulating the friction on the brake band, mechanical means for holding the brake band at different tensions on the intermediate partition, said means comprising a plate slidably mounted on the enlarged portion of the handle and having an end engaging the projecting portion of the brake band, and a tubular extension from and integral with the enlarged portion of the handle forming a guide for a line.

OSCAR A. GARR.